United States Patent [19]

Freeman

[11] 3,987,409
[45] Oct. 19, 1976

[54] VEHICLE SIGNAL LIGHT

[76] Inventor: Anthony L. Freeman, 511 L. St. NW., Washington, D.C. 20001

[22] Filed: Sept. 26, 1974

[21] Appl. No.: 509,498

[52] U.S. Cl. .............................. 340/134; 40/129 B; 240/7.55; 301/37 SA
[51] Int. Cl.² ........................ B62J 3/00; B62J 5/00
[58] Field of Search ............ 340/134, 133; 280/200; 310/75 R, 75 B, 75 A, 75 C, 158, 159; 240/7.55, 7.6; 350/97, 101; 315/76, 80, 135; 322/1; 301/37 SA; 40/129 B, 125 M

[56] References Cited
UNITED STATES PATENTS

| | | | |
|---|---|---|---|
| 3,602,550 | 8/1971 | Patane | 301/37 S |
| 3,894,777 | 7/1975 | Yamada | 40/129 B |

*Primary Examiner*—John W. Caldwell
*Assistant Examiner*—Donnie L. Crosland
*Attorney, Agent, or Firm*—John B. Dickman, III

[57] ABSTRACT

A bicycle is provided with safety apparatus consisting of a plurality of battery powered lights attached to the spokes of the bicycle wheels. The wheels are covered on each side with an apertured cover attached to the bicycle frame. Rotation of the wheels causes the lights to pass the apertures and be visible as flashing lights to the sides.

3 Claims, 5 Drawing Figures

VEHICLE SIGNAL LIGHT

BACKGROUND OF THE INVENTION

The present invention relates to safety devices for bicycles and more particularly to warning lights which are visible from the sides of the bicycle.

With the advent of bicycling as a major sport, and its encroachment onto the thoroughfares heretofore almost the exclusive preserve of the motor vehicle, the need for more safety means for bicyclists is becoming acute.

In any accident between a motor vehicle and a bicycle it is the bicycle that loses.

Even in daylight hours it is common for the operator of a motor vehicle involved in an accident with a bicycle to state that he did not see the bicycle.

Therefore, it only follows that in a time of reduced visibility, as at night the problem is compounded.

Most jurisdictions have statutes which require bicycles to have either lights or reflectors which show ahead and astern, but by far and large, the very vulnerable side areas are overlooked.

Therefore, apparatus toward alleviating this problem is needed.

SUMMARY OF THE INVENTION

It is the primary object of this invention to provide apparatus to be used on bicycles which will provide flashing light warnings, visible from the sides of the bicycle.

It is also an object of this invention to provide safety apparatus for bicycles which is constructed from readily available, economical, easily installed materials.

These and other objects will become apparent when taken in conjunction with the following drawings and detailed description in which:

DESCRIPTION OF THE PREFERRED EMBODIMENT

Figure 1:
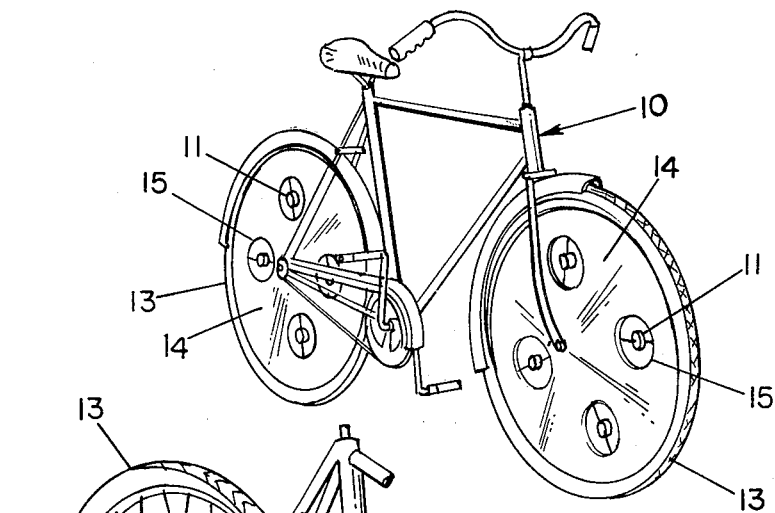
FIG. 1 is a view of a bicycle with the preferred embodiment.
Figure 2:
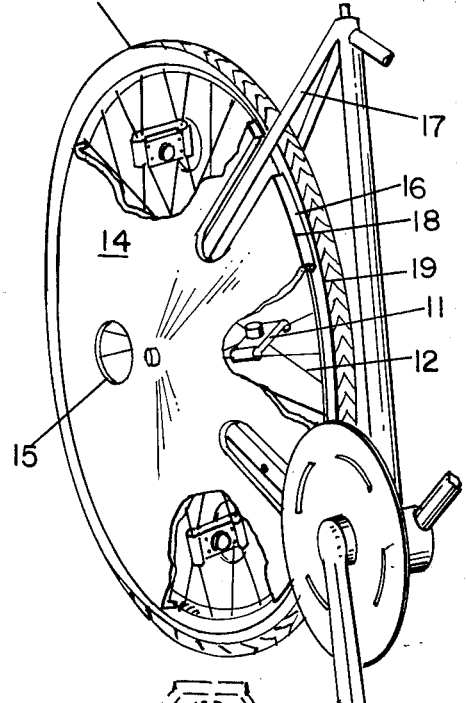
FIG. 2 is a view of the rear wheel of the preferred embodiment showing the lights and covers.

A bicycle 10 has a plurality of battery powered lights 11 attached by suitable means to the spokes 12 of the wheels 13.

A wheel cover 14 having apertures 15 therethrough and an inwardly extending peripheral flange 16 is attached by suitable means, outside the bicycle frame 17, one to each side of each wheel 13, to cover all of the spokes 12.

The periphery 18 of the wheel cover 14 extends into the area of the wheel rim 19 only to a point where it will not interfere with the rim engaging brake (not shown), and the inwardly extending peripheral flange 16 forms a shield to substantially contain the illumination of the spoke attached lights 11 from projecting ahead and astern so as to conflict with any standard fore and aft lighting or reflectors (not shown).

The inwardly extending peripheral flange 16 has cutouts therein to clear the bicycle frame 17.

The battery powered lights 11 are located on the spokes 12 at substantially the same diametric dimensions as the apertures 15 in the wheel covers 14 whereby in operation, with the lights 11 turned on and the wheel 13 revolving, the lights 11 will pass by the apertures 15 in the wheel covers 14 and be visible as flashing lights from each side of the bicycle 16.

Figure 3:
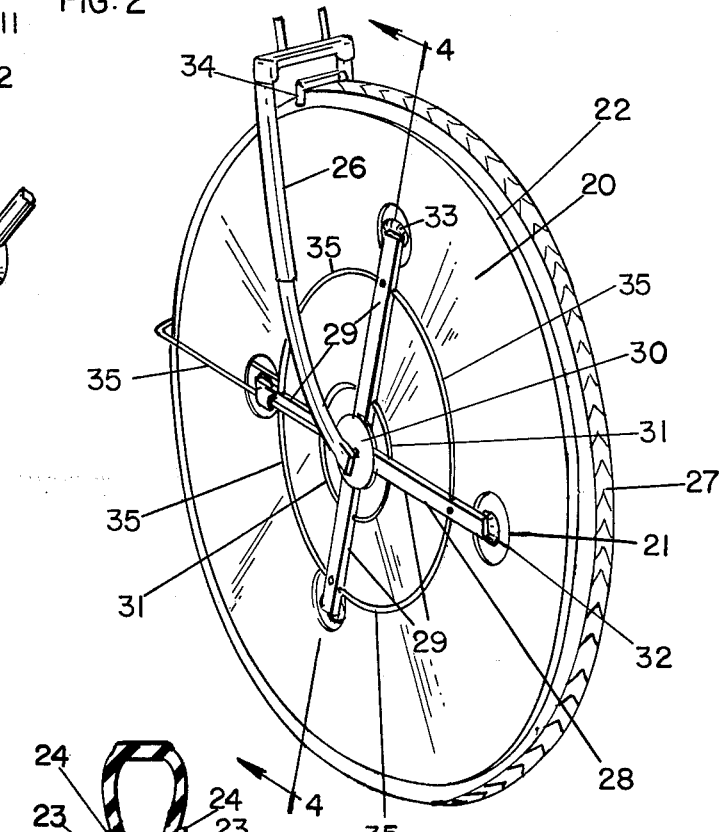
FIG. 3 is a view of the front wheel of another embodiment.
Figure 4:
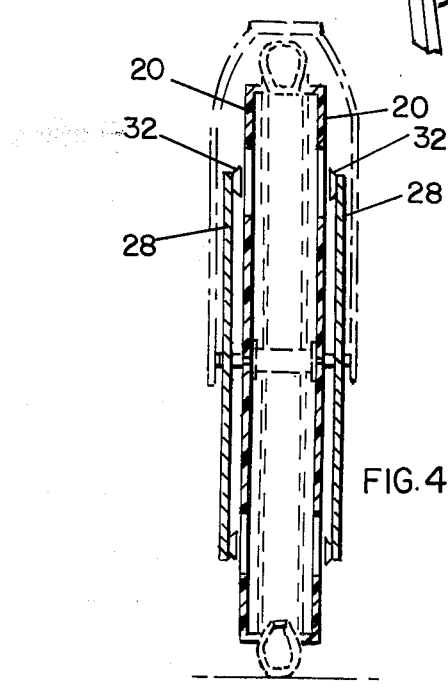
FIG. 4 is a section of FIG. 3 taken along line 4—4.
Figure 5:
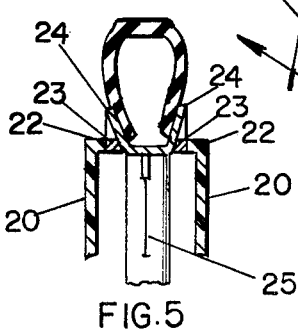
FIG. 5 is an enlarged view of the top of FIG. 5 showing the cover attachment.

As shown in FIGS. 3, 4 and 5 a second embodiment comprises a wheel cover 20 having apertures 21 therethrough and with an inwardly extending peripheral flange 22. The cover 20 is attached by suitable means 23 such as magnets to each side of each wheel rim 24.

The cover 20 extends over the spokes 25 and the inwardly extending peripheral flange 22 extends into the area of the wheel rim 24 only to a point where it will not interfere with the operation of the rim engaging brake (not shown).

Rigidly attached to the bicycle frame 26 on each side of each wheel 27 by suitable means is a lighting assembly 28, comprising a plurality of centrally joined, outwardly extending support members 29. The support members 29 are suitably attached to a reinforcing plate 30 and reinforcing rods 31 are located between the outwardly extending support members 29. Each outwardly extending support member 29 terminates in a light socket having a light bulb 33 therein.

The light sockets 32 are suitably shielded so that the light from the light bulb 33 will be directed inwardly toward the wheel 27.

The light sockets 32 are connected to each other and to a wheel driven electric power generator 34 by an electric conduit 35.

The light bulbs 33 are located at substantially the same diametric dimension as the apertures 21 in the wheel covers 20 so that in operation, with the wheels 27 rotating, current from the generator 34 will illuminate the light bulbs 33 and the apertures 21 in the wheel covers 20 will pass by which will show the lights to each side of the bicycle 10.

For the purpose of illustration the covers 14 and 20 are shown as plastic but metal or any other suitable material may be used.

I claim:

1. An apparatus for providing side viewable safety lights on a bicycle of the type having a frame and spoked wheels rotatably attached to said frame, comprising a plurality of spaced, self-contained, battery powered lights, said lights being attached to the spokes of said wheels, wheel covers having apertures therethrough attached to said frame and covering said spokes, wherein said lights are adapted to intermittently shine through the apertures in said wheel covers when said bicycle is in motion.

2. The structure as set forth in claim 1, in which said wheel covers cover said spokes and said lights in a manner so that said intermittently shining safety lights will be viewable from the sides only.

3. The apparatus as described in claim 2 wherein said apertures in said wheel covers, and said battery powered spoke attached lights are located at substantially the same diametric dimension whereby when said lights are illuminated and said wheels are rotating, said battery powered spoke attached lights will pass by said apertures in said wheel covers and the side viewable safety lights will be visible.

* * * * *